United States Patent [19]

Wills

[11] 4,312,729

[45] Jan. 26, 1982

[54] DEWATERING WITH ELECTRICALLY AUGMENTED VACUUM FILTER

[75] Inventor: Walter R. Wills, Cedar Knolls, N.J.

[73] Assignee: Engelhard Minerals & Chemicals Corporation, Edison, N.J.

[21] Appl. No.: 202,407

[22] Filed: Oct. 31, 1980

[51] Int. Cl.$^3$ ............................................. B01D 13/02
[52] U.S. Cl. ......................... 204/180 P; 204/180 R; 204/299 R; 204/301; 210/321.1; 210/321.2
[58] Field of Search .......... 204/180 R, 299 R, 180 P, 204/301, 300; 210/321.1, 321.2

[56] References Cited

U.S. PATENT DOCUMENTS

| | | | |
|---|---|---|---|
| 2,500,878 | 3/1950 | Sieling | 204/180 R |
| 2,571,247 | 10/1951 | Huebotter | 204/180 R |
| 4,003,811 | 1/1977 | Kunkle | 204/180 R |

Primary Examiner—Arthur C. Prescott
Attorney, Agent, or Firm—Inez L. Moselle

[57] ABSTRACT

A perm-selective membrane is used in an electrokinetic cell of an electrically augmented vacuum filter (EAVF) to prevent the migration of anions from the anode and optionally cathode compartments. The perm-selective membrane in the form of a film laminated to a support grid effectively prevents migration of anions into the filter cake and migration of fine particle solid to be filtered from the slurry into the anolyte and/or catholyte.

11 Claims, 8 Drawing Figures

EAVF CATHODE-ANODE ARRANGEMENT
(PRESENT CONFIGURATION)

CATHODE COMPARTMENT
(PRESENT CONFIGURATION)

ANODE COMPARTMENT
(PRESENT CONFIGURATION)

ELECTROFILTER
CATHODE-ANODE
ARRANGEMENT
(INVENTION)

ANODE COMPARTMENT
(INVENTION)

CATHODE COMPARTMENT
(INVENTION)

DEWATERING WITH ELECTRICALLY AUGMENTED VACUUM FILTER

BACKGROUND OF THE INVENTION

1. Field of the Invention

This invention relates to improvements in the operation of known electrically augmented vacuum filters, hereinafter EAVF, in dewatering aqueous suspension. More specifically this invention relates to the use of special membranes to restrict the migration of certain ionic species and particulate solids in dewatering with EAVF. The invention is especially concerned with improvements in dewatering suspensions of kaolin clay.

2. Prior Art

Filtration of slurries by electrokinetic methods (electrophoresis, electroosmosis) has a relatively long history. Reference is made to U.S. Pat. No. 1,229,203 to Schwerin (1917) which discloses electrically dewatering dispersed suspensions of fine-particle size solids. Recent interest in electrofilters has intensified as a result of increased demand for hydrated (uncalcined) kaolin clay in the form of dispersed fluid high-solids (e.g. 70%) slurries instead of dry powders and to produce higher feed solids to clay dryers when it is necessary to ship in dry powder form. A commercially utilized design of such a unit is disclosed in U.S. Pat. No. 4,168,222 and U.S. Pat. No. 4,107,026 to Freeman, the entire disclosure of which are incorporated herein by cross-reference thereto. These patents describe the workings of an electrically augmented vacuum filter (EAVF). An electro-osmotic/phoretic process for concentrating clay is disclosed in U.S. Pat. No. 4,110,189 to Kunkle et al. An electroflocculation cell is disclosed in U.S. Pat. No. 4,048,038 to Kunkle, and an electrokinetic cell is disclosed in U.S. Pat. No. 3,980,547 also to Kunkle.

The incorporation of an electrofilter as part of an improved system for producing calcined clay by utilizing the electrofilter to dewater relatively dilute, e.g. 40% solids, slurries of dispersed kaolin to levels suitable for spray drying, e.g. 55 to 60% solids, is disclosed in the allowed application Ser. No. 1,898 to Mixon, which application is commonly assigned with applicant's. The entire disclosure of said application is incorporated herein by cross-reference.

Clay is conventionally wet-processed by slurrying crude clay in water with the aid of dispersing chemicals such as sodium silicate, sodium hexametaphosphate, sodium tripolyphosphate and tetrasodium pyrophosphate. Certain polymeric organic materials are also employed, alone or in combination with inorganic dispersants. The clay slurry is blunged, degritted, classified and bleached to remove undesirable foreign matter and to improve brightness and other end-use properties. In many operations the clay is also beneficiated to remove discrete impurities especially those that are colored. Following these steps, the clay is dewatered or filtered to produce a solid filter cake of 50 to 60% clay. This cake may then be redispersed and spray dried or otherwise dried in the flocculated state or dispersed (deflocculated) state depending upon the end use.

For various reasons it is becoming increasingly desirable for the clay producers to ship slurries containing about 70% solids. The addition of 30 to 50% spray dried clay to a slurry of 50–60% solids redispersed filter cake is conventionally practiced at the present time to yield a 70% solids slurry. This addition of spray dried clay to the filter cake adds significantly to the cost of the slurry due to the relatively high costs of preparing the spray dried clay. Therefore it would be desirable to be able to prepare 70% solids slurries without the necessity of adding spray dried clay. Similarly it would be beneficial to increase the solids content of filtered feed charged to dryers when it is desired to supply the clay in dried form.

The use of an electrofilter with vacuum may be advantageous for its ability to dewater suspensions economically. The electrofilter operates on the principle that charged particles when subject to the action of an applied (direct current) electric field will move in the direction of opposite polarity. This traveling of solid particles through a liquid due to the application of an electric field is called electrophoresis. The clay particles are normally negatively charged and move toward the anode (+) electrode. When applied to aqueous clay suspensions, electrophoresis causes suspended clay particles to deposit on a filter medium surrounding the anode. Commercial EAVF systems include an anolyte chamber associated with each anode and means for charging anolyte solution into and out of the chamber. Vacuum at the anode is used to retain anolyte and remove gaseous products of reaction. Vacuum at the cathode is used to remove filtrate liquid and gaseous products of reaction at the cathode.

Other ionic species notably sodium cations arising principally from the dispersant and the anolyte, and chloride and hydroxyl anions will also move in the electric field. Reactions at the electrodes will generate ionic species and gaseous products depending upon the electrolytes used. For example, in the EAVF the anodic compartment may be filled with an electrolyte such as sodium chloride solution. Under the action of the electric field chlorine gas is produced at the anode and sodium ions will move away from the anode and react (with an electron) at the cathode to produce sodium hydroxide and hydrogen gas. Hydroxyl anions, being negatively charged, will move away from the cathode at a rate determined by the strength of the electric field and the motion of the filtrate resulting from the applied vacuum at the cathode.

In general electrically augmented filtration of kaolin slurries is often more cost-effective than conventional means, because less energy is used to achieve an equivalent result. In addition, when the cake discharge of such a filter is saleable virtually as is without further processing, the desirability of incorporating EAVF in kaolin processing schemes becomes plain.

However several problems may arise in the operation of an EAVF. Mobility of ions in the electrtokinetic cell may give rise to undesirable anions being present in the filter cake. For example, if $OH^-$ ions are present in the filter cake, optimum dispersion of the cake becomes impossible, since the slurry is overdispersed and slurry viscosity is undesirably high as a result. The ionic contamination of the filter cake using an EAVF operated with an anolyte has resulted in excessive viscosity of the clay slurry product and an excessively low specific resistance of the clay slurry product. This has limited use of the system for filtering clay intended for paper coating or paint applications. Also, under the pressure driving forces (vacuum) fine particle size kaolin may seep through the tightly woven filter cloths presently in use and contaminate the anolyte at the anode or the filtrate at the cathode.

Thus an object of the invention is to improve the effectiveness of an EAVF and thereby to enhance and extend the utility of such filtration system.

A more specific object of the present invention is to provide means for preventing undesirable anions from contaminating the filter cake on an EAVF.

Another object of the invention is to provide means for preventing fine particle size kaolin from seeping into the anolyte.

Other objects and advantages of the invention will become evident to those skilled in the art by the following description and discussion.

THE INVENTION

I have invented an improved system and process for dewatering aqueous suspensions of particulate solids, especially dispersed suspensions of hydrous kaolin clay, by means of an EAVF in which the anode structure contains means for circulating an anolyte within the anode structure substantially as described in U.S. Pat. No. 4,168,222 (supra). In accordance with the invention a perm-selective membrane is incorporated onto the anode structure. Such membrane prevents the passage of anions and gaseous reaction products from the anolyte while allowing cations to move freely therethrough. As a result, anions such as chloride ions originating in the anolyte do not contaminate the filter cake deposited on the anode with deleterious effects noted above. Furthermore, the perm-selective membrane in the form of a film supported on a grid effectively prevents fine particles of kaolin from contaminating the electrolyte in the andoe compartments (anolyte) while simultaneously preventing contamination of the filter cake by seepage of anions from the anolyte through the membrane. In a presently preferred embodiment, the perm-selective membrane is placed around the anode support structure between the grid and the filter medium normally associated with the anodic structure of an EAVF that is operated with a circulating anolyte.

Preferably the cathodic structure of the EAVF is also altered from the configuration described in the aforementioned patents of Freeman by placing a perm-selective membrane capable of selectively passing only cations onto the cathode structure and by adding a chamber for catholyte and means for charging and withdrawing catholyte therefrom. The perm-selective membrane prevents contamination of feed slurry and filter cake by the cathodic reaction products (primarily hydroxyl ions). It should be noted here that in this embodiment the cathode support structure is conductive and is in fact the electrode. Catholyte solution is, in effect, formed in situ and typically contains $OH^-$ and $Na^+$. In this embodiment it is necessary to change the cathode compartment from that described in the aforementioned patents of Freeman by: placing a perm-selective membrane on the inner cathode support structure (the cathode electrode); placing filter medium supported on a second, nonconductive outer support grid; and adding an electrolyte (catholyte) and recirculation system within the cathode support structure similar to that of the anode compartment. This arrangement prevents anions such as hydroxyl ions arising at the cathode from migrating under the influence of the electric field across the space between the electrodes and contaminating the feed suspension and/or the filter cake.

In a specially preferred embodiment of the instant invention the EAVF system includes a multiplicity of parallel and alternating anodes and cathodes and a perm-selective membrane is placed around each anode and each cathode support structure of the system.

The perm-selective membranes used in practice of the present invention differ from the so-called "semi-permeable membranes" described in the aforementioned patents of Kunkle and Kunkel et al.; the membranes used in the prior art structures are simply filter cloths and are so described in the patents of Kunkle and Kunkle et al.

BRIEF DESCRIPTION OF THE DRAWINGS

Further description of the process and system of the present inventive concept will be made with reference to the accompanying drawings. In the drawings, the system and process of the invention are illustrated by way of simplified diagrammatic flow schemes; corresponding systems and flow schemes of the prior art are presented to facilitate comparison. It will be noted that only the anodic and/or cathodic structures of EAVF are shown. These are believed to provide a concise illustration and clear understanding of the invention without providing detail nonessential to an understanding of the invention. For example, in all drawings the anode and cathode structures are understood to be submerged in slurry to be dewatered in an EAVF. Means for lifting the anode structure with deposited filter cake are known in the art and details for effecting lifting of anode and scraping off filter cake therefrom before dropping the anode structure back into feed slurry for further deposition of filter cake are not shown. Similarly, vacuum means associated with anode and cathode structures, pumps, etc., are not shown.

FIG. 2 shows the flow of filtrate and principal catholyte constituents ($H_2$, $Na^+$ and $OH^-$). A front view of such cathode structure is given in FIG. 7 of U.S. Pat. No. 4,168,222.

FIG. 3 illustrates diagrammatically the slurry, deposition of filter cake, flow of gas and ions when the anolyte is sodium chloride.

As illustrated in FIG. 5, the anolyte is sodium chloride. (For a front view of the modified anode structure, reference is made to FIG. 5 of U.S. Pat. No. 4,168,222).

FIG. 8 illustrates the cathodic reaction, flow of resulting reaction products ($H_2$, $Na^+$ and $OH^-$) and illustrates how the perm-selective membrane in cooperation with added catholyte chamber functions to prevent $OH^-$ resulting from the cathodic reaction from passing into feed slurry by being diverted into the catholyte chamber for removal with catholyte. Compare with FIG. 2, discussed above.

DESCRIPTION OF THE PREFERRED EMBODIMENTS

Figure 1:
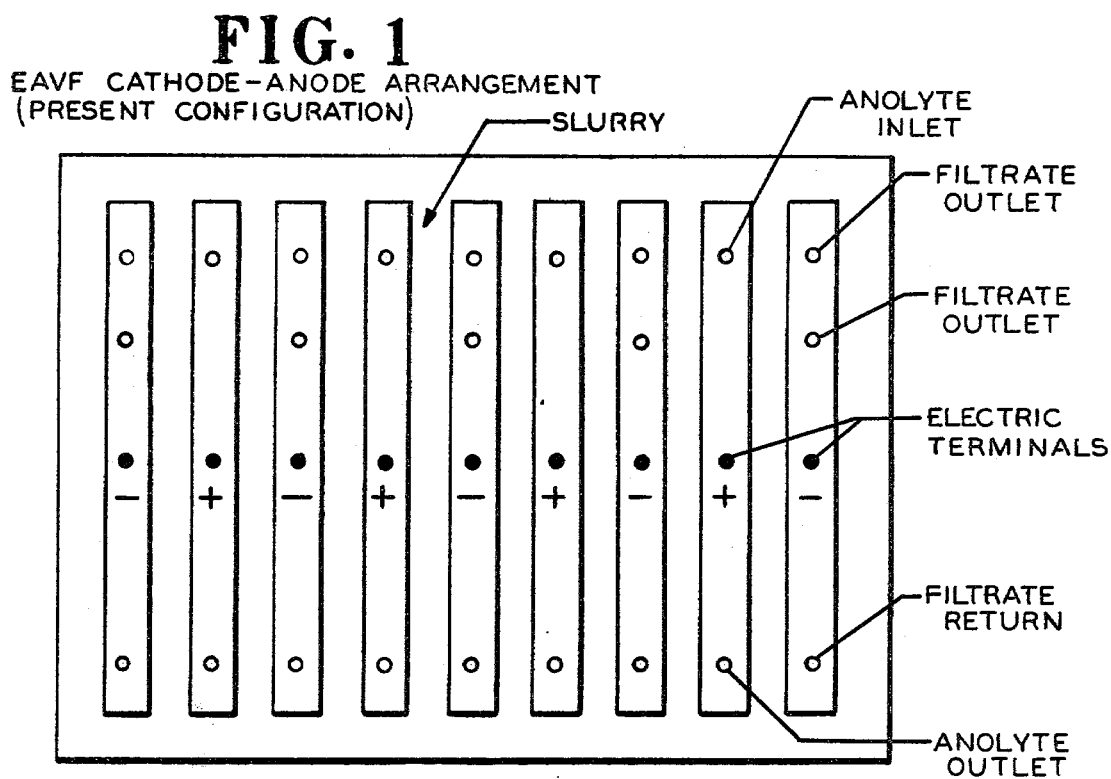
FIG. 1 is a top view (illustrated diagrammatically) of the cathode structure of an EAVF (present configuration).
Figure 2:
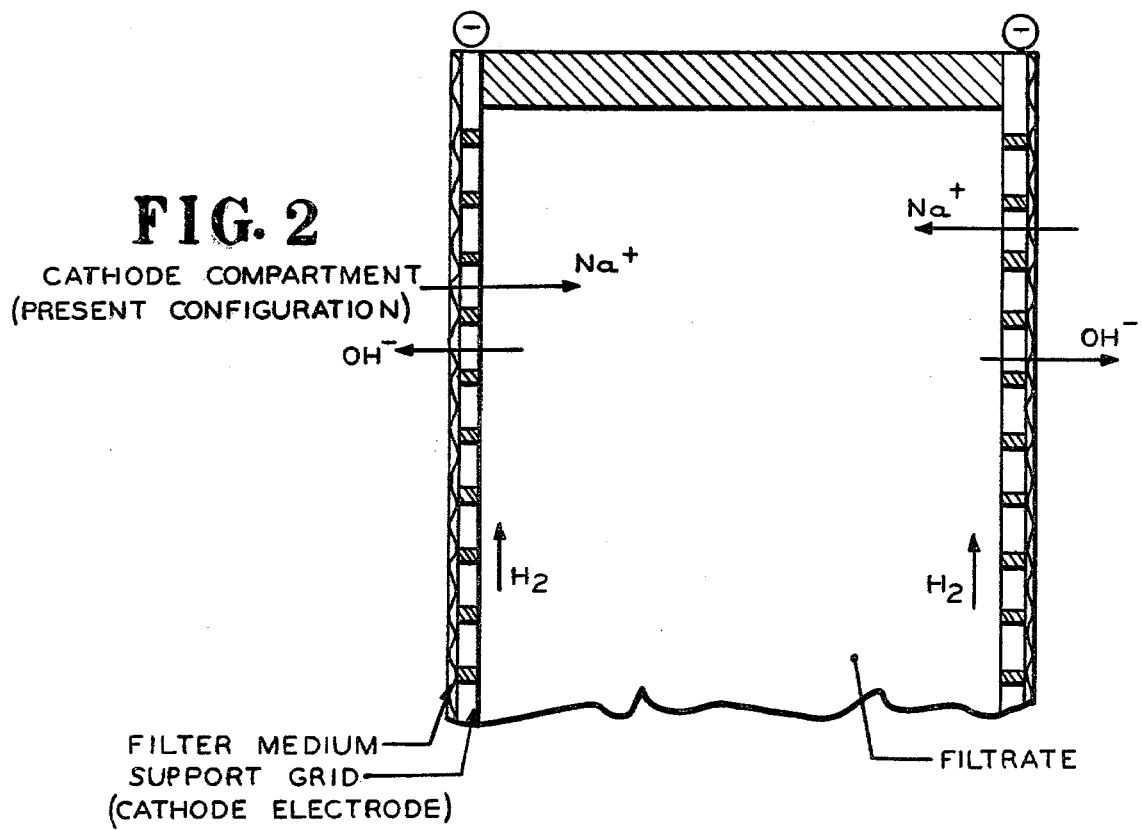
FIG. 2 is a side view (illustrated diagrammatically) of the operation of the present cathode structure of an EAVF.
Figure 3:
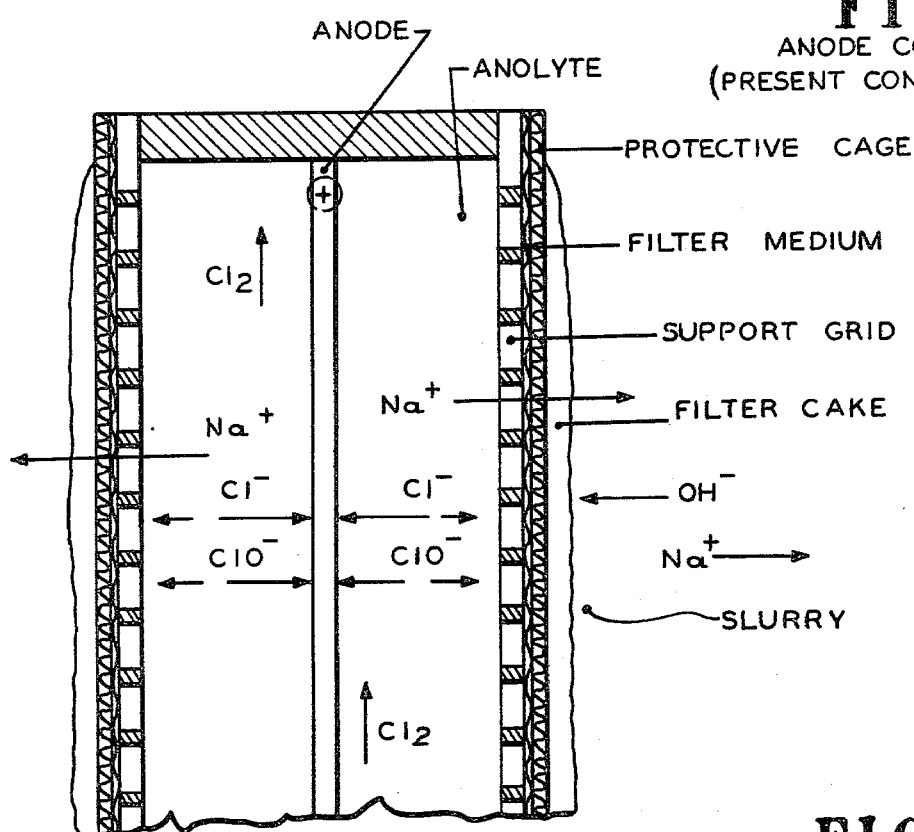
FIG. 3 is a side view, (illustrated diagrammatically) of the present anode structure including an anolyte chamber. Reference is made to FIG. 5 of U.S. Pat. No. 4,168,222 for an illustration of a front view of such structure.
Figure 4:
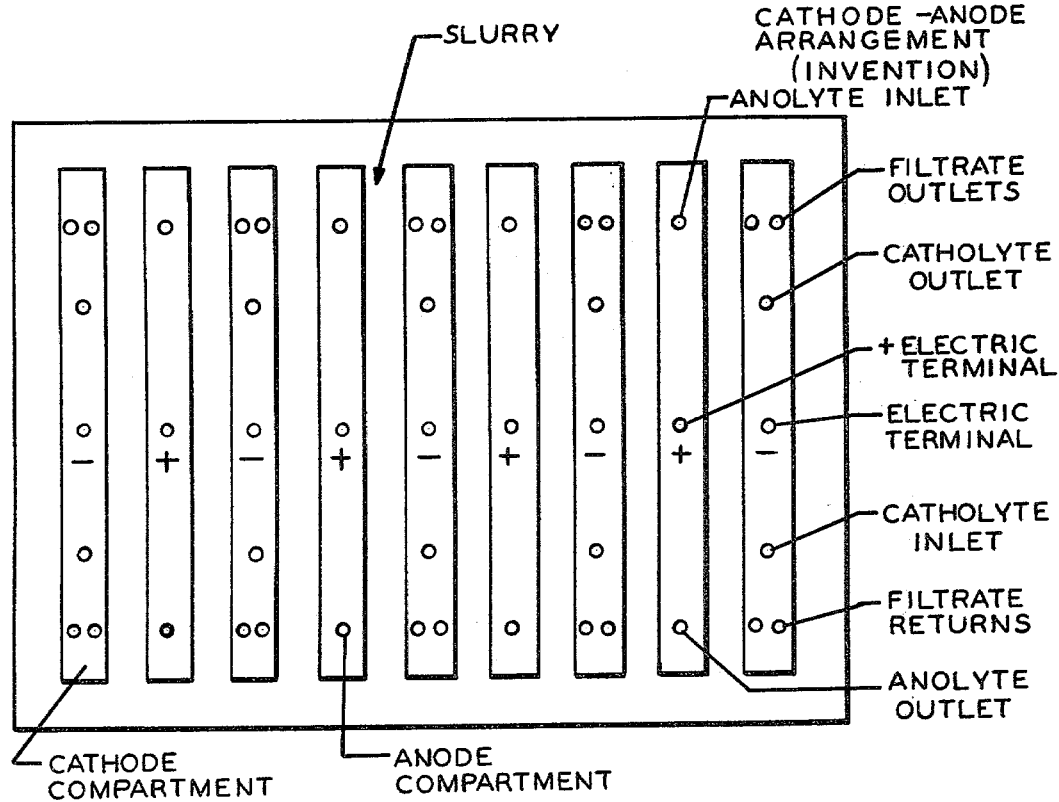
FIG. 4 is a top view of a preferred electrofilter cathode-anode arrangement of the invention illustrating the provision for circulation of catholyte. For purposes of comparison, see FIG. 1.

The hydrous kaolin clay slurries to be dewatered by the improved EAVF of the present invention may be destined for, and as a result, tailored to specific end uses. For example, the dewatered suspensions (slurries) may be used in paper coating or paint formulations and as such the kaolin clay particles will usually have sizes in the range of about 80 to 100% finer than 2 microns, equivalent spherical diameter (e.s.d.) with average particle sizes of 0.3 to 0.9 microns, e.s.d. The clay product discharged from the improved EAVF of the present invention may be used to produce calcined clay pigments as described in said copending patent application.

It is preferred to dewater these slurries in deflocculated (dispersed) condition wherein deflocculation is accomplished with anionic inorganic and/or organic dispersants, such as TSPP (tetrasodium pyrophosphate), Calgon ® (sodium hexametaphosphate), and/or ammonium or sodium polyacrylates. The dispersants enhance the negative charge surrounding the clay particles and hence their electrophoretic mobility.

One embodiment of an EAVF described in U.S. Pat. No. 4,168,222 comprises a tank, a series of parallel and alternating cathode and anode electrodes submerged in a circulating slurry of clay solids suspended in a carrier liquid in the tank. A direct current is applied to the electrodes to deposit solids as a filter cake on the walls of the support structure of the anode. Each anode is a self-contained hollow structure having planar surfaces and comprises an anode (+) electrode, means for circulating an electrolyte (anolyte) in and out of the compartment, a support grid, a filter medium and a protective cage. When the anolyte is sodium chloride solution, chlorine gas will be generated at the anode by virtue of electrochemical reaction. The extent of reaction is dependent on the electric current density, but the vacuum applied to the anode and the recirculating anolyte are effective means for removal of the majority of the gas from the anode compartment.

Irrespective of modification of the EAVF to provide for association of a perm-selective membrane with each cathodic structure, the cathodes will have liquid-pervious walls, in particular a liquid-pervious filter cloth (substantially impervious to the passage of clay) covering a supporting grid or grid-like structure. Cloth similar to that used on the anode support structure may be used as the filter medium. A source of vacuum connected to the hollow, planar cathode causes the liquid phase of the slurry (filtrate) to fill the hollow interior of each cathode between the electrode and the support structure. Filtrate is pumped from the filtrate-filled hollow cathodes at a controlled rate. Under application of electric current the filtrate, which contains various ionic species and water, will react at the cathode to produce primarily hydrogen gas and sodium hydroxide solution.

The apparatus also includes an overhead traveling carriage equipped with hoists to raise an anode vertically out of the slurry. Doctor blades associated with the traveling carriage are constructed to scrape the clay filter cake adhering to both planar surfaces of the anode while the anode is being returned to the tank. Scraped clay is collected on a conveyor belt. The operation is repeated on the next anode in sequence. Means are provided to pump slurry to and from the tank to keep the electrodes submerged during dewatering operations. The current density and vacuum are controlled to achieve a desired balance between the migration of clay to the anodes and removal of filtrate through the cathodes.

Slurry is charged to an EAVF as a fluid dispersed (deflocculated) aqueous suspension. Typically, pH is in the range of 6 to 9.5. Deflocculants include but are not limited to sodium hydroxide, sodium condensed phosphates, sodium carbonate and mixtures thereof. As mentioned organic dispersants may be used. Conventional amounts of dispersants are present in the dispersed slurry of clay fed to the electrofilter. For example, the slurry may contain 3 to 6 pounds of commercial sodium silicate solution such as O ® brand. Typical clay solids content of feed slurries and filter cakes are disclosed in Ser. No. 1,898, U.S. Pat. No. 4,168,222 and U.S. Pat. No. 4,107,206.

Figure 5:
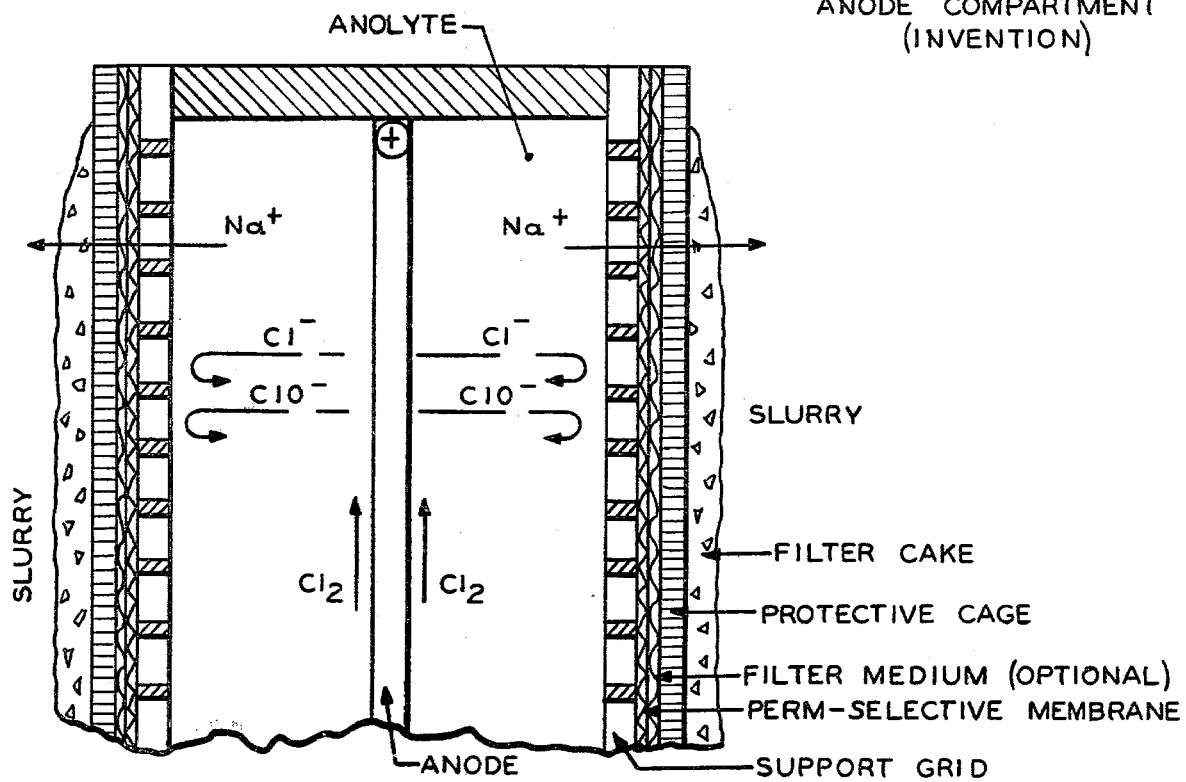
FIG. 5 is a side view of the anode compartment in accordance with the invention showing the modified path for ion migration resulting from the presence of a perm-selective membrane on the anode structure.
Figure 8:
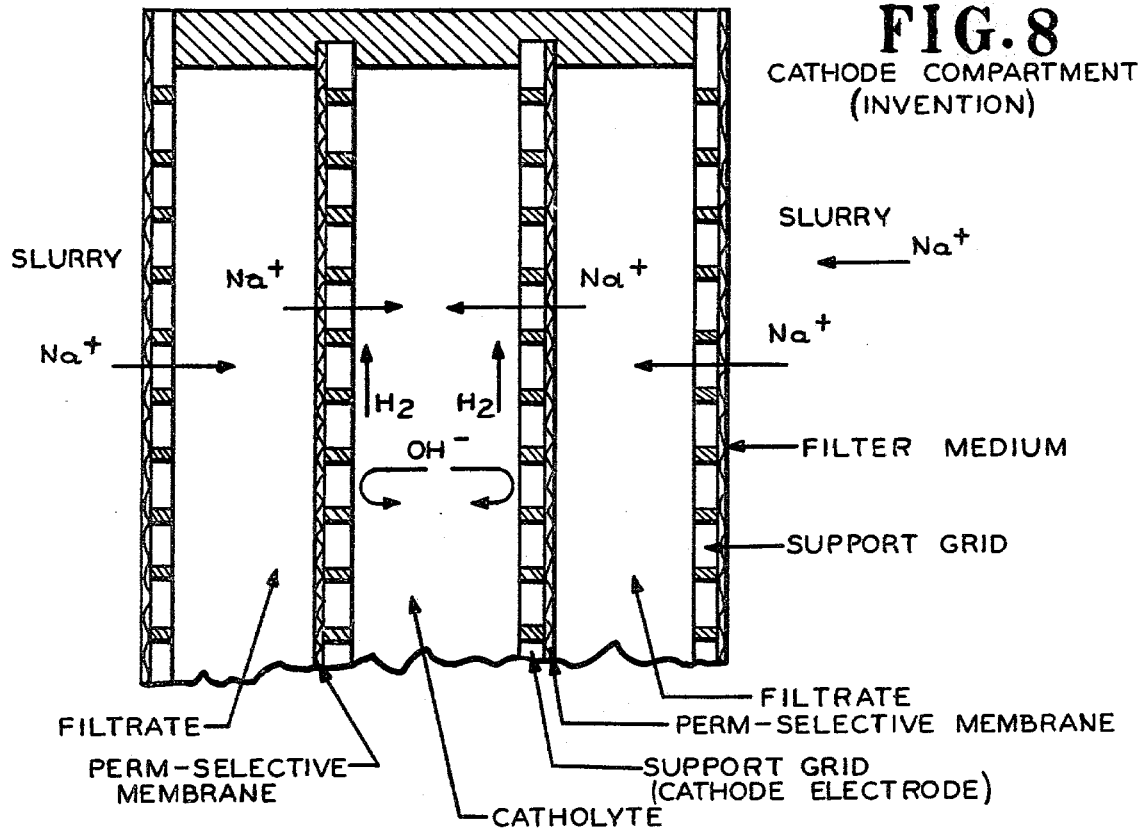
FIG. 8 is a side view of a cathodic structure of the invention, illustrating the features of a catholyte chamber and perm-selective membrane.
Figure 6:
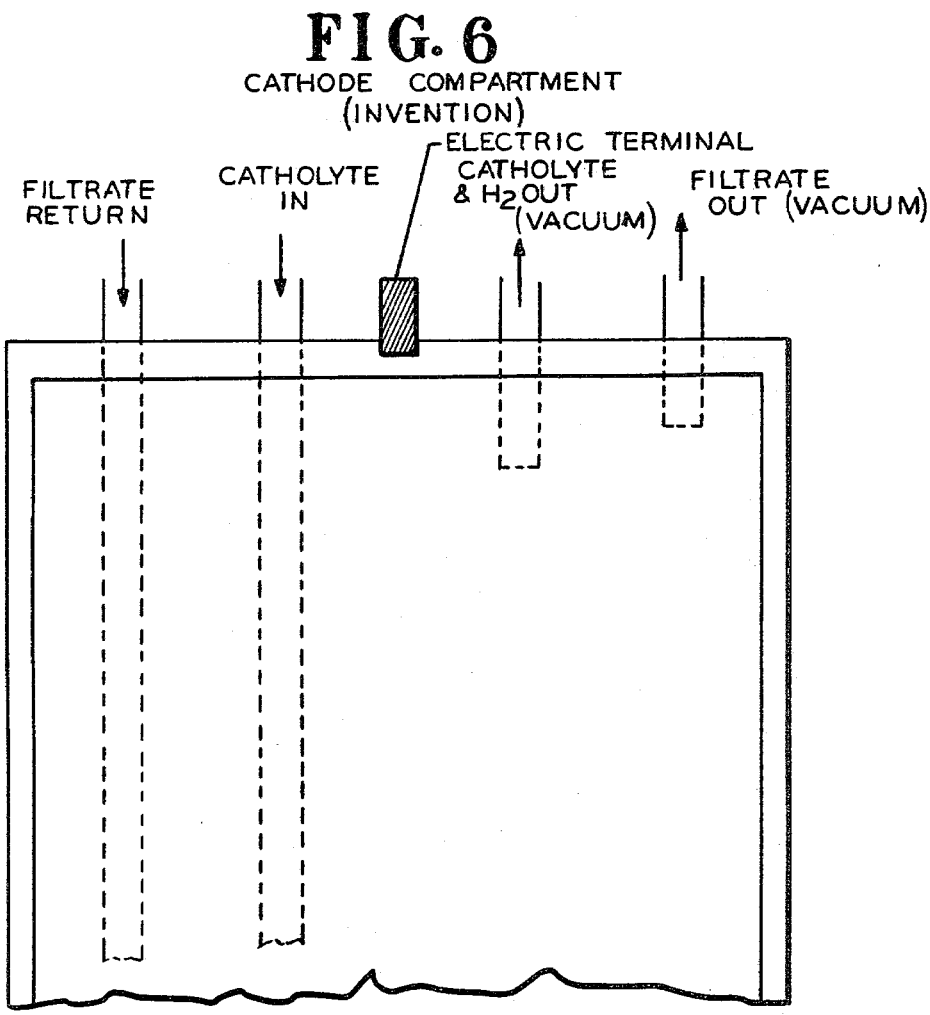
FIG. 6 illustrates a front view of the cathode structure of the invention and shows the provision of a catholyte compartment and circulation of catholyte therein. Also shown in the flow of filtrate.
Figure 7:
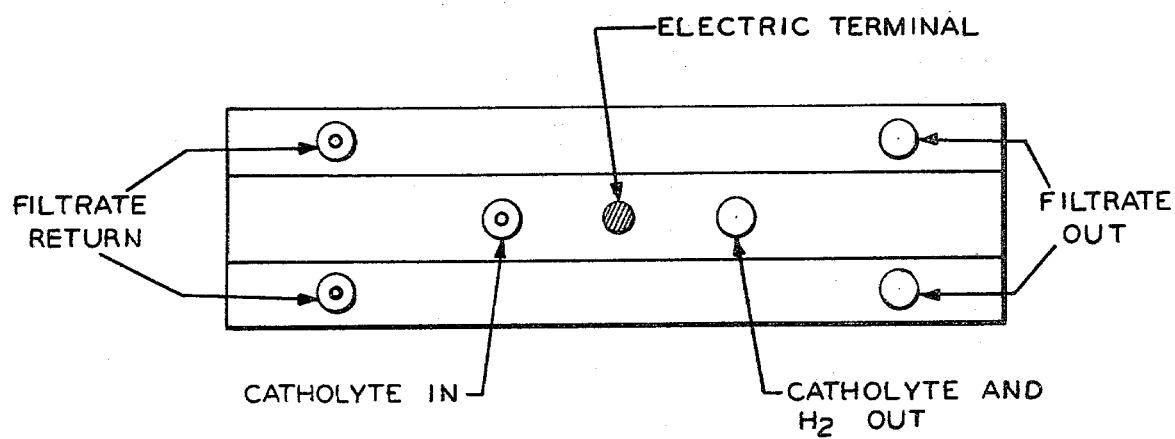
FIG. 7 is a top view of the structure illustrated in FIG. 6.

With reference to FIG. 5 it is presently preferred to place the perm-selective membrane onto the anode compartment between the support directly adjacent to it and the filter medium acts to minimize the possibility of clay solids clogging the perm-selective membrane. When the cathode structure is equipped with a perm-selective membrane, the membrane must be positioned on two inner support grids, which also constitute the cathode electrode, thereby forming a center compartment which is adapted to contain the catholyte solution. During start-up it may be necessary to introduce a solution of electrolyte into the catholyte compartment. During operation electrolyte is formed in situ by the electrolyte reactions occurring at the cathode. As shown in FIG. 8, an outer, nonconductive filter medium support grid covered with a filter medium is provided on each of the two operating sides of the cathode structure, forming inner spaces between the nonconductive filter medium support grid and the perm-selective membrane in which filtrate is collected. A recirculation mechanism for the catholyte is also added.

Exemplary of suitable anolytes are sodium chloride, sodium carbonate and sodium hydroxide solutions. Others may be used. Use of nonchloride anolytes avoids liberation of chlorine gas at the anode and eliminates the possibility of corrosive chloride and hypochlorite ions contacting metal parts. When sodium carbonate is used, oxygen gas and carbon dioxide are liberated at the anode. The use of a sodium hydroxide solution as the anolyte provides the advantage of high electrical conductivity without the generation by corrosive reaction products.

Sodium cations migrate to the cathode and undergo electrochemical reaction involving water. Hydrogen gas is given up in the reaction and sodium hydroxide is formed. Thus in prior practice involving dewatering kaolin slurries the filtrate had a high pH, generally 10 to 13. When the perm-selective membrane is used surrounding the cathode electrode grid within an outer, nonconductive support structure on which the filter medium is placed, sodium ions migrate through the membrane and undergo reaction at the cathode, liberating hydrogen which is taken up into the catholyte solution. The $OH^-$ ions report into the catholyte compartment and are prevented from migrating into the filtrate by the perm-selective membrane, giving rise thereby to a filtrate of more neutral pH. This prevents contamination of the feed suspensions of filter cake with hydroxyl and other anions which are deleterious to the dispersion of the slurry. In the case of kaolin slurries, anion contamination of the filter cake raises the viscosity of kaolin/water slurries and renders the kaolin unsuitable for use in its intended applications for paper coatings or for fillers in paints.

Membranes suitable for purposes of the invention are permeable to cations and substantially impermeable to anions, gases, water and other liquids. Useful perm-selective membranes are perfluorosulfonic acid polymeric materials sold under the trademark Nafion ® by E. I. du Pont de Nemours, Inc. Other membranes of a perm-selective nature can be used. The performance of Nafion membranes depend to a large extent upon the number of sulfonic acid groups in the polymer structure. The membrane itself has superior chemical stability and toughness relative to other perm-selective membranes; for example, those made with carboxylic acid groups in place of sulfonic acid groups. Nafion membranes are permeable to positively charged ions (cations) but are impermeable to negatively charged ions (anions).

I claim:

1. In a system for dewatering a suspension of particulate solids such as hydrous kaolin clay using a known electrically augmented vacuum filter apparatus comprising a tank adapted to receive and discharge suspension to be filtered, and anodic and cathodic electrode structures adapted to be positioned in said tank in a manner such as to be submerged in suspension in said tank, said anodic electrode structure being adapted for deposition thereon of filter cake and including an anodic element, electrically nonconductive housing surrounded by a filter medium for said anodic element and means for supplying anolyte into and out of said housing, said cathodic electrode structure including a cathodic element and being surrounded by a filter medium adapted for the passage therethrough of filtrate, the improvement which comprises a perm-selective membrane associated with said anodic structure in a manner such as to permit passage of cations from said anolyte therethrough and into and through said filter cake and suspension to be filtered while substantially preventing passage of anions and gaseous electrochemical reaction products from said anolyte therethrough and into filter cake deposited on said anodic structure.

2. The system of claim 1 wherein said anodic structure also contains a filter medium to minimize deposit of particulate solid on said membrane and/or to provide mechanical protection for said membrane.

3. The system of claim 1 wherein said anodic structure does not contain a filter medium and said membrane is in the form of a film that is sufficiently strong to obviate the need for a filter medium for mechanical protection.

4. The system of claim 1 which comprises the further improvement of a catholyte chamber associated with said cathodic element for housing a catholyte solution, means for circulating catholyte solution into and removing catholyte solution reaction products from said catholyte chamber, a filtrate chamber exterior to said catholyte chamber, means for removing filtrate from the filtrate chamber, a perm-selective membrane capable of passing cations while substantially preventing the passage of anions or gases and positioned between said catholyte and said filtrate chambers which substantially prevents said anions and gases from passing into the filtrate or the suspension being dewatered, and a filter medium surrounding the filtrate chamber which substantially prevents particulate solids from passing into the filtrate chamber.

5. The system of claim 1, 2, 3 or 4 wherein said perm-selective membrane or membranes comprises a perfluorosulfonic acid polymeric film.

6. An improved process for dewatering a suspension of particulate solid which comprises dewatering said suspension in the system of claim 1.

7. The process in accordance with claim 6 wherein said suspension comprises a deflocculated aqueous suspension of clay.

8. The process of claim 6 wherein said clay is hydrous kaolin clay.

9. The process of claim 6 wherein said anolyte contains sodium ions and said membrane is permeable thereto.

10. The process of claim 7 wherein said anolyte is selected from the group consisting of sodium chloride, sodium hydroxide and sodium carbonate.

11. The process of claim 6 wherein said perm-selective membranes associated with said anode structure comprise a perfluorosulfonic acid polymeric film.

* * * * *